United States Patent
Allard

(10) Patent No.: US 8,851,375 B2
(45) Date of Patent: Oct. 7, 2014

(54) SYSTEMS AND METHODS FOR FACILITATING IN-AISLE SCANNING

(71) Applicant: NCR Corporation, Duluth, GA (US)

(72) Inventor: John C. Allard, Hobe Sound, FL (US)

(73) Assignee: NCR Corporation, Duluth, GA (US)

( * ) Notice: Subject to any disclaimer, the term of this patent is extended or adjusted under 35 U.S.C. 154(b) by 103 days.

(21) Appl. No.: 13/723,633

(22) Filed: Dec. 21, 2012

(65) Prior Publication Data

US 2014/0175164 A1    Jun. 26, 2014

(51) Int. Cl.
*G06K 15/00* (2006.01)
*G06Q 30/06* (2012.01)

(52) U.S. Cl.
CPC .................................. *G06Q 30/06* (2013.01)
USPC .............................. 235/383; 235/385; 705/23

(58) Field of Classification Search
USPC ...................................... 235/383, 385; 705/23
See application file for complete search history.

(56) References Cited

U.S. PATENT DOCUMENTS

| | | | | |
|---|---|---|---|---|
| 5,979,757 | A   * | 11/1999 | Tracy et al. | 235/383 |
| 7,575,161 | B2 * | 8/2009  | Nguyen et al. | 235/383 |
| 8,517,266 | B2 * | 8/2013  | Yamada et al. | 235/383 |
| 2002/0178088 | A1 * | 11/2002 | Lurie et al. | 705/26 |
| 2008/0230603 | A1 * | 9/2008 | Stawar et al. | 235/383 |
| 2013/0282533 | A1 * | 10/2013 | Foran-Owens et al. | 705/27.1 |

* cited by examiner

*Primary Examiner* — Daniel Hess
(74) *Attorney, Agent, or Firm* — Kevin P. Belote

(57) ABSTRACT

Various methods are described for facilitating in-aisle scanning of one or more items to be purchased at a store. One example method may comprise scanning a barcode associated with an item. The method may further comprise adding the item to a list of items to be purchased. Additionally, the method may comprise receiving an indication that the item needs to be weighed. The method may further comprise flagging the item in the list to be weighed during checkout. Similar and related methods, apparatuses, and computer program products are also provided.

22 Claims, 6 Drawing Sheets

SYSTEMS AND METHODS FOR FACILITATING IN-AISLE SCANNING

BACKGROUND OF THE INVENTION

The self-service industry continues to grow as customers become savvier with technology. In many industries, customers voluntarily participate in self-checkout, whether at the grocery store, gas station, movie theater, or other venues. Grocery stores in particular have seen enormous growth in self-checkout lanes. Oftentimes, customers with just a few items to purchase can avoid long lines by using self-checkout stations, while the stores themselves can use fewer staff than is required at typical checkout lines. In fact, the practice of self-checkout has become so prevalent that lines are now beginning to develop even at these stations. As a result, some venues are allowing customers to begin the process of checking out while browsing the aisles of the store. With this in-aisle checkout process, a customer may use a device to scan items as they shop. Once the customer reaches the checkout line, there is no need to re-scan the items, and the customer may simply pay for the transaction and leave, at times after being subjected to minimal auditing.

Problems still exist with this new approach, however. For example, many items in grocery stores do not have individual barcodes that may be scanned in aisle. Additionally, some items require further action, such as weighing, before their price can be determined. The in-aisle devices, however, are often not equipped to perform these additional actions leaving the customer to complete the actions at checkout. These additional actions, such as weighing products, can be some of the most time consuming actions associated with checkout. Therefore, the lines still may be long causing delays for the customers at checkout.

Accordingly, it may be desirable to provide systems, methods, apparatuses, and computer program products for facilitating in-aisle scanning that avoid the above, and other, drawbacks associated with the current art.

BRIEF SUMMARY OF THE INVENTION

Various embodiments of the present invention provide systems, methods, apparatuses, and computer program products for facilitating in-aisle scanning. An example method for facilitating in-aisle scanning of one or more items to be purchased at a store may comprise scanning a barcode associated with an item; adding the item to a list of items to be purchased; receiving an indication that the item needs to be weighed; and flagging the item in the list to be weighed during checkout.

In an example embodiment, scanning the barcode may comprise capturing an image of the barcode with a camera.

In another example embodiment, scanning the barcode associated with the item may further comprise scanning the barcode associated with the item at a first location in the store proximate a second location in the store where the item is on display and remote from a third location in the store where checkout occurs.

In yet another example embodiment, scanning the barcode associated with the item may further comprise scanning a barcode located on a structure proximate the second location where the item is on display.

In an example embodiment, the method may further comprise determining an item code for the item from the barcode; sending the item code to a point-of-sale device; and receiving the indication that the item needs to be weighed from the point-of-sale device.

In another example embodiment, the method may further comprise sending an indication of the list of items to be purchased to a point-of-sale device, wherein the list of items comprises one or more items flagged to be weighed during checkout.

Another example method for facilitating a transaction at a store for one or more items scanned in-aisle may comprise receiving an indication of a list of items to be purchased, wherein the list comprises an item flagged to be weighed; displaying an image of the item flagged to be weighed; and providing a request to a user to weigh the item.

In an example embodiment, the request may comprise an identification of the item comprising at least one of a text identification and an audio identification.

In another example embodiment, the method may further comprise storing the list of items to be purchased in association with a transaction identifier, wherein the received indication of the list of items to be purchased comprises the transaction identifier.

In yet another example embodiment, storing the list of items to be purchased may further comprise: receiving at least one message from a mobile device, each message identifying an item scanned by the mobile device to be added to the list of items to be purchased; and storing the item identified in each method to the list of items to be purchased.

In another example embodiment, the list of items may comprise an item code for each item in the list, and displaying an image of the item flagged to be weighed may further comprise: searching for the image of the item flagged to be weighed in a database based at least in part on the item code associated with the item; and obtaining the image from the database.

An example apparatus for facilitating in-aisle scanning of one or more items to be purchased at a store may comprise at least one processor; and at least one memory comprising computer program code, the at least one memory and the computer program code configured to, with the at least one processor, cause the apparatus at least to: scan a barcode associated with an item; add the item to a list of items to be purchased; receive an indication that the item needs to be weighed; and flag the item in the list to be weighed during checkout.

Another example apparatus for facilitating a transaction at a store for one or more items scanned in-aisle may comprise at least one processor; and at least one memory comprising computer program code, the at least one memory and the computer program code configured to, with the at least one processor, cause the apparatus at least to: determine an item code for the item from the barcode; send the item code to a point-of-sale device; and receive the indication that the item needs to be weighed from the point-of-sale device.

BRIEF DESCRIPTION OF THE DRAWINGS

Figure 1:
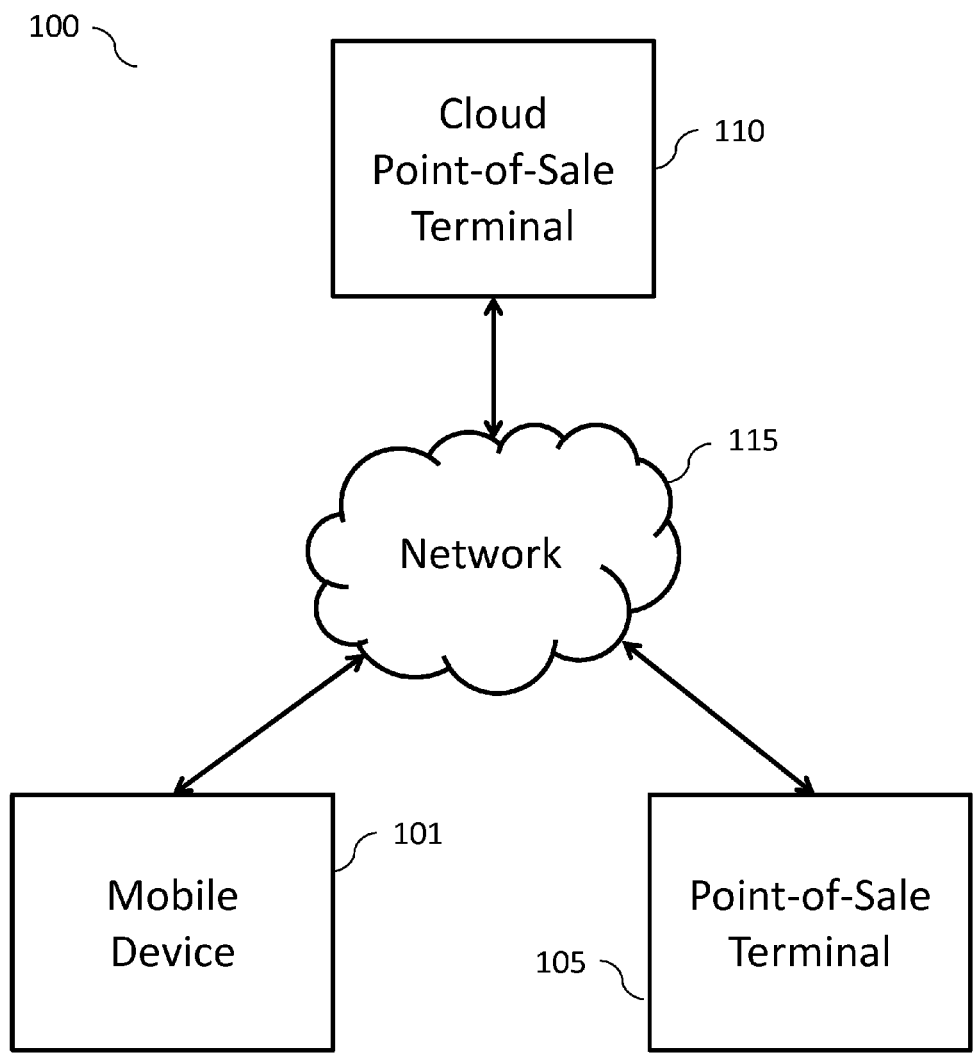

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:
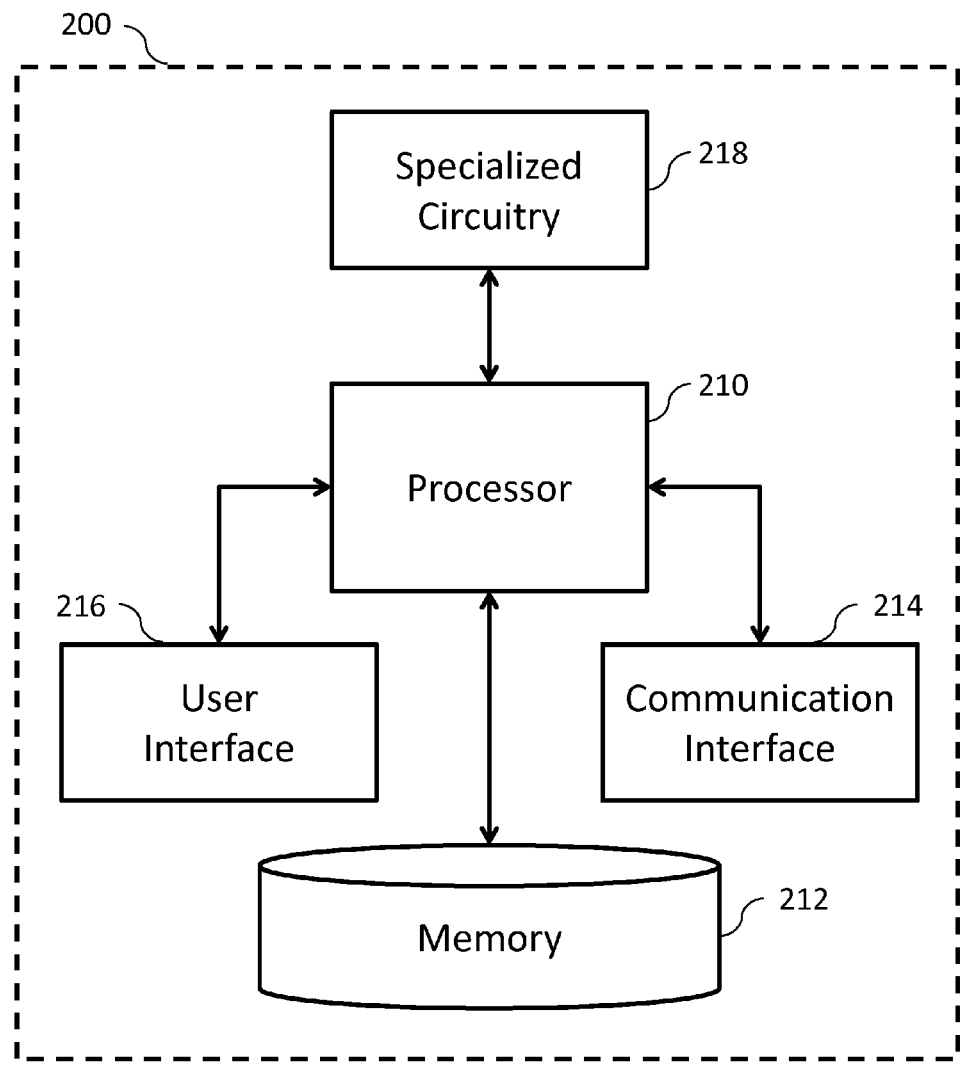

FIG. 2 provides a schematic diagram of a generic apparatus according to an embodiment of the present invention.

Figure 3A:
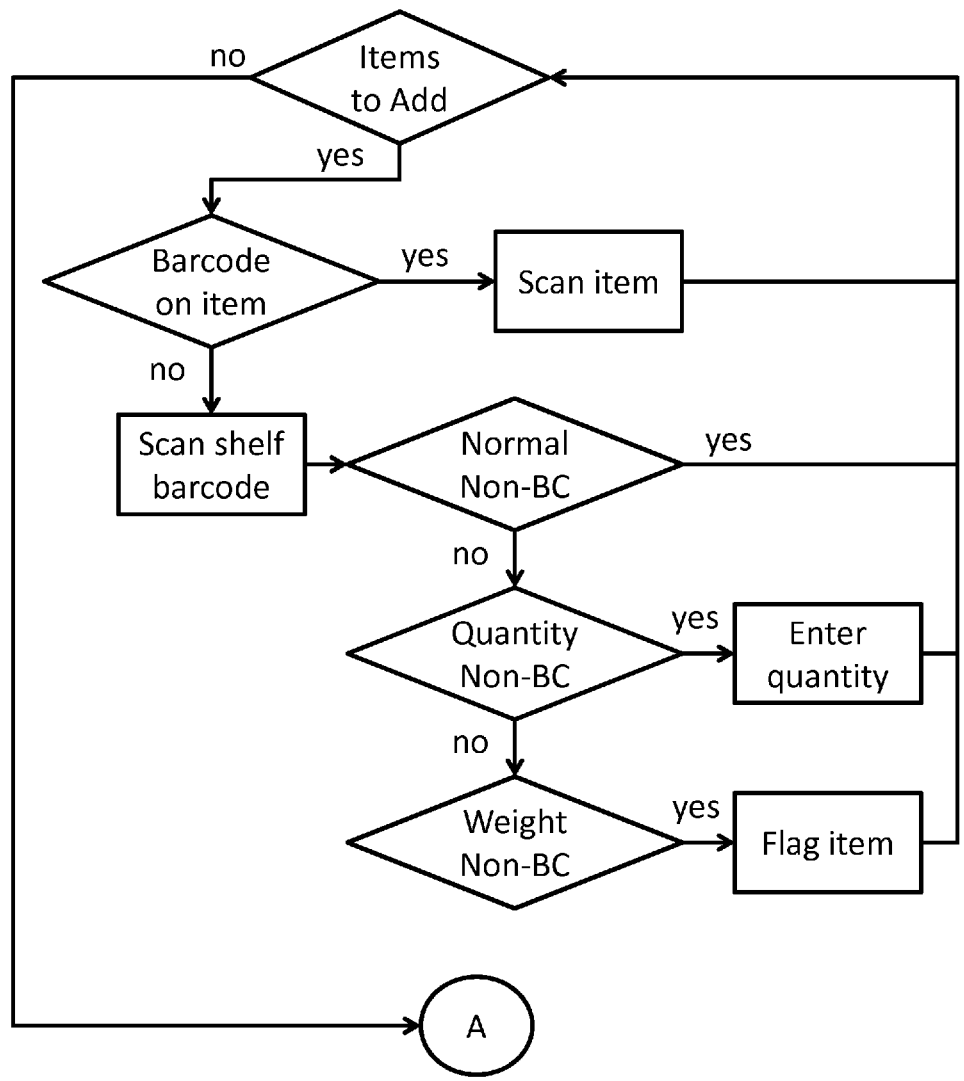
Figure 3B:
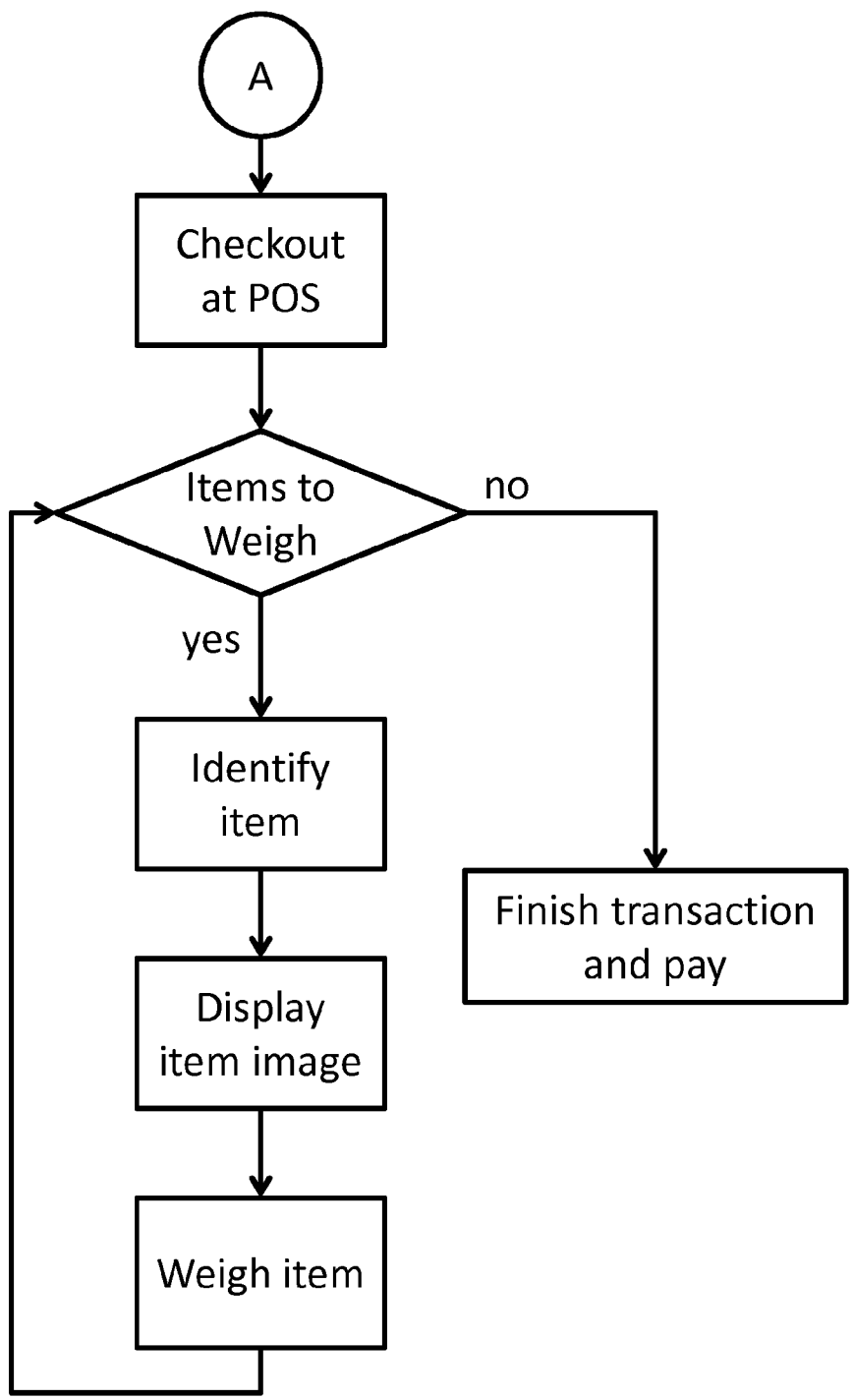

FIGS. 3A and 3B provide a flowchart for a general process for facilitating in-aisle scanning according to an embodiment of the present invention.

Figure 4:
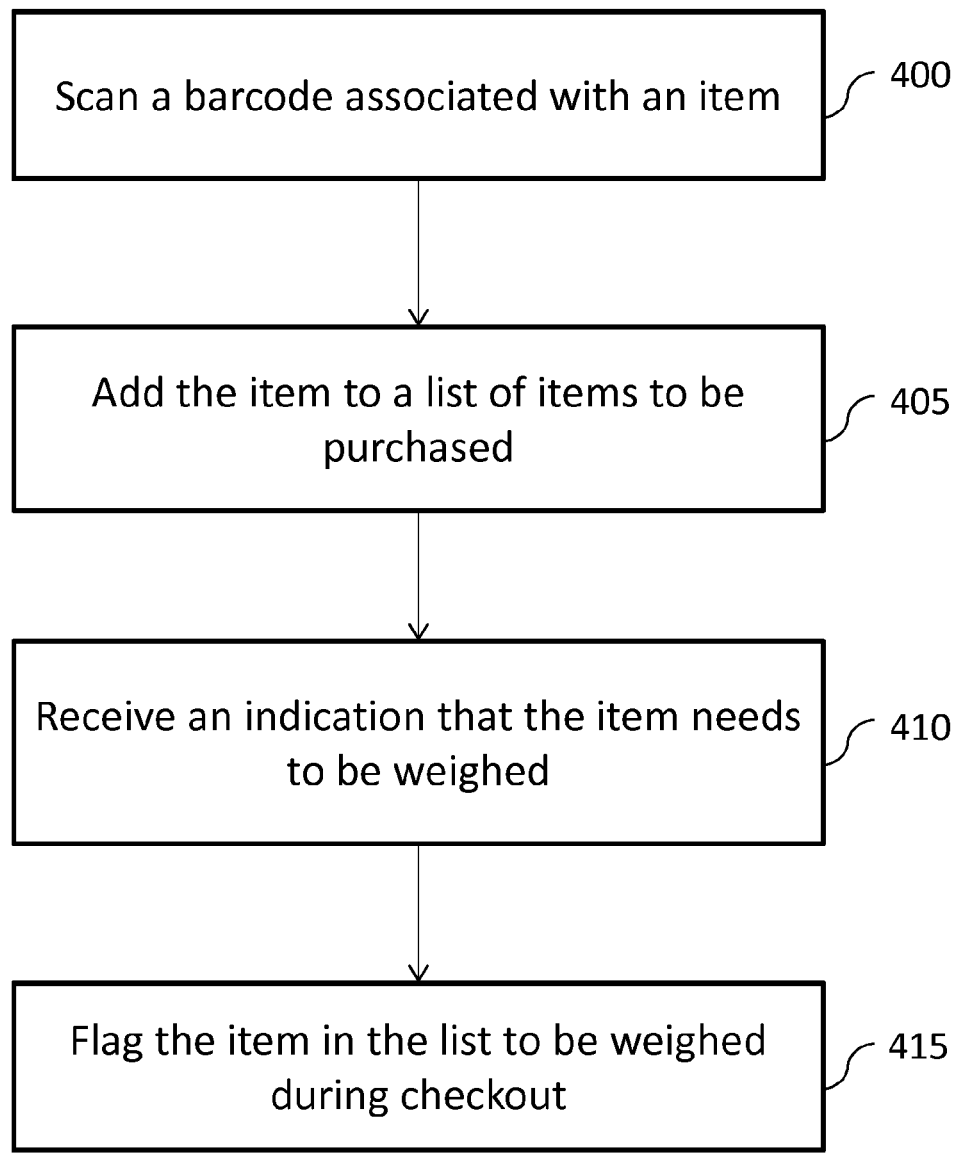

FIG. 4 provides a flowchart for facilitating in-aisle scanning from the perspective of a mobile device according to an embodiment of the present invention.

Figure 5:
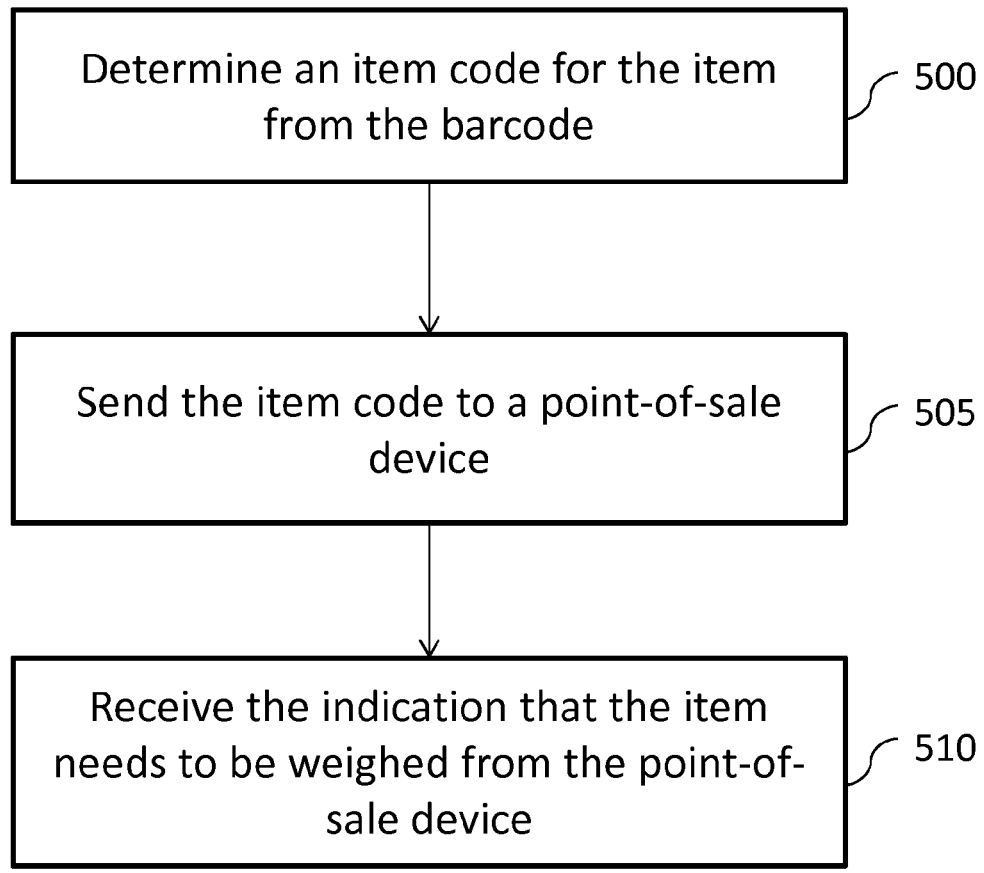

FIG. 5 provides a flowchart for facilitating in-aisle scanning from the perspective of a point-of-sale terminal according to an embodiment of the present invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

FIG. 1 provides an illustration of a system 100 that can be used in conjunction with various embodiments of the present invention to facilitate in-aisle scanning. As shown in FIG. 1, the system 100 may include one or more mobile devices 101. For instance, a mobile device 101 may comprise a smartphone device, mobile telephone, mobile computer, portable digital assistant (PDA), laptop computer, gaming device, electronic tablet, or any other type of similar electronic device. The system 100 may further include one or more point-of-sale terminals 105. Additionally, the system 100 may comprise one or more cloud point-of-sale terminals 110. Each entity of the system 100 may be connected, directly or indirectly, to one or more other entities of the system 100 via a network 115. The network 115 may be a wired and/or wireless network comprising one or more of a local area network, wide area network, cellular network, internet, or the like. It should be noted that other system architectures are contemplated that may be used to practice various aspects of the invention. Thus, the system 100 provided in FIG. 1 is for illustrative purposes only and should not be construed to limit the scope of the invention. Further, while FIG. 1 illustrates certain system entities as separate, standalone entities, the various embodiments are not limited to this particular architecture.

In various embodiments, a mobile device 101, a point-of-sale terminal 105, and/or a cloud point-of-sale terminal 110 may be embodied as or otherwise include an apparatus 200 as generically represented by the block diagram of FIG. 2. In the example embodiment, the apparatus 200 may comprise various means for performing the various functions herein described. These means may comprise one or more of a processor 210, memory 212, communication interface 214, user interface 216, or specialized circuitry 218. The various means may be in communication with one another, such as via a bus.

The means of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., the processor 210), or some combination thereof. In some example embodiments, the processor 210, memory 212, communication interface 214, user interface 216, and/or specialized circuitry 218 may be embodied as a chip or chip set.

The processor 210 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 2 as a single processor, in some embodiments the processor 210 may comprise a plurality of processors. The plurality of processors may be in operative communication with each other and may be collectively configured to perform one or more functionalities of the apparatus 200 as described herein. The plurality of processors may be embodied on a single device or distributed across a plurality of devices collectively configured to function as the apparatus 200.

In some example embodiments, the processor 210 may be configured to execute instructions stored in the memory 212 or memory otherwise accessible to the processor 210. These instructions, when executed by the processor 210, may cause the apparatus 200 to perform one or more of the functionalities of the apparatus 200 as described herein. Further, the processor 210 may comprise functionality to operate one or more software programs, which may be stored in memory. For example, the processor 210 may be capable of operating a connectivity program, such as a web browser. The connectivity program may allow the apparatus 200 to transmit and receive web content, such as location-based content, according to a protocol, such as Wireless Application Protocol (WAP), hypertext transfer protocol (HTTP), and/or the like. The apparatus 200 may be capable of using protocol(s), such as Transmission Control Protocol/Internet Protocol (TCP/IP), to transmit and receive web content across the internet or other networks.

The memory 212 may comprise, for example, volatile memory, non-volatile memory, or some combination thereof. In this regard, the memory 212 may comprise one or more tangible and/or non-transitory computer-readable storage media that may include volatile and/or non-volatile memory. Although illustrated in FIG. 2 as a single memory, the memory 212 may comprise a plurality of memories. The plurality of memories may be embodied on a single device or may be distributed across a plurality of devices collectively configured to function as the apparatus 200. In various example embodiments, the memory 212 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 212 may be configured to store information, data, applications (e.g., software programs), instructions, and/or the like, in some instances for execution by the processor 210, for enabling the apparatus 200 to carry out various functions in accordance with various example embodiments.

The communication interface 214 may be embodied as any device or means embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. The communication interface 214 may include, for example, an antenna, a transmitter, a receiver, a transceiver, and/or supporting hardware or software for enabling communications with one or more remote devices. The communication interface 214 may be configured to receive and/or transmit data using any protocol that may be used for communications between devices.

The user interface 216 may be in communication with the processor 210 to receive an indication of a user input and/or to provide an audible, visual, mechanical, or other output to a user. As such, the user interface 216 may include, for example, a keyboard, keypad, scanner, printer, mouse, joystick, display (e.g., touch screen display), microphone, speaker, and/or other input/output mechanisms. The processor 210 and/or user interface circuitry comprising the processor 210 may be configured to control one or more functions of the user interface 216 through computer program instructions (e.g., software and/or firmware) stored on memory (e.g., memory 212) accessible to the processor 210.

The specialized circuitry 218 may be embodied as various means, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210.

General Overview

FIGS. 3A and 3B provide a flowchart of a general overview of a process for facilitating in-aisle scanning according to various embodiments of the present invention. In these embodiments, a customer may enter a store (e.g., a grocery store) to shop for items. The customer may possess or borrow a mobile device that allows him to perform in-aisle scanning of the items to be purchased while shopping to expedite the checkout process. The process begins in FIG. 3A when the user determines whether there are any items he would like to add to his cart for purchase. If a new item is to be added, the user first determines whether the item contains a barcode. If the item contains a barcode, the user simply scans the barcode with his mobile device and adds the item to his cart. The mobile device may communicate with a point-of-sale device to identify the scanned item and receive information about the item, which the mobile device may store and/or display during the shopping process.

If the new item to be added does not contain a barcode, the user may locate a barcode associated with or proximate the structure (e.g., a shelf or case) or area where the item is on display. The user may then scan the barcode on the shelf associated with the non-barcoded item. The mobile device may communicate with a point-of-sale device to identify the scanned item and receive information about the item. If the item is a normal non-barcoded item (e.g., a single head of lettuce), the mobile device may store and/or display the information received from the point-of-sale terminal and proceed. If the item is a non-barcoded item that requires a quantity (e.g., oranges), the mobile device may request the user enter the quantity of the particular item to be purchased. The mobile device may then send this additional quantity information to the point-of-sale terminal, and the mobile device may receive further information from the point-of-sale terminal in response. The user may then proceed. If the item is a non-barcoded item that must be weighed (e.g., bananas), the mobile device may flag the item to be weighed later during checkout. The mobile device may then send a message to the point-of-sale terminal that the item will be weighed at checkout and proceed. Once the user has finished adding items to his transaction, he may proceed to the operations depicted in FIG. 3B to complete the transaction.

In FIG. 3B, the user continues the process by proceeding to check out at a point-of-sale terminal. The user may enter information, scan a barcode on his mobile device, or otherwise present identifying information to the point-of-sale terminal to identify the customer's intent to use the particular point-of-sale terminal for checkout. The point-of-sale terminal may obtain a list of the items associated with the user's transaction from the mobile device or from its own storage. The point-of-sale terminal then determines if any items in the list have been flagged to be weighed. If so, the point-of-sale terminal identifies the item to the user or store clerk. For example, the point-of-sale terminal may present a text or audio prompt to the user or store clerk identifying the item. The point-of-sale terminal may then look up a picture of the item to be weighed and display the picture on a display associated with the point-of-sale terminal. The user may then find the item in his cart and weigh the item on a scale associated with the point-of-sale terminal. The point-of-sale terminal may store the weight and update the transaction list to reflect the weight of the item. Once all items flagged for weighing have been weighed, the user may complete the transaction and pay for the items purchased. In some instances, further audit practices may be conducted (e.g., comparing total weight of the shopping cart to a predicted weight) before the user leaves the store.

Detailed Embodiments

Turning to a more detailed description of a process for facilitating in-aisle scanning according to various embodiments of the present invention, a customer, or user, may visit a store to purchase items. The store may allow the customer to perform in-aisle scanning of the items to prepare for expedited checkout. For example, the customer may be permitted to select items for purchase from the store, scan the items at the time of selection, and present an indication of the scanned items at checkout. In this regard, the customer may not be required to re-scan all of the items at the checkout area.

The customer may scan the items while shopping using a mobile device 101. The mobile device 101 may be the customer's personal device (e.g., smartphone) or a device provided temporarily by the store (e.g., a handheld scanning device). The mobile device 101 may be configured to connect to a network (e.g., network 115) to facilitate the in-aisle scanning process. The network may be, for example, a network for which access is provided by the store. In this regard, the network may be a local network (e.g., a Wi-Fi network) with or without access to an external network (e.g., the internet). Communication between the mobile device 101 and a point-of-sale terminal 105 and/or a cloud point-of-sale terminal 110 may occur via the network. In this regard, the mobile device 101 and the point-of-sale terminal may share information back and forth about the shopping transaction of the customer. For example, the mobile device 101 may send messages to the point-of-sale terminal providing indications of the items selected for purchase, and the point-of-sale terminal may provide the mobile device 101 with additional information about the selected items, as further described below.

During the shopping process either or both of the mobile device 101 and the point-of-sale terminal (e.g., point-of-sale terminal 105 or cloud point-of-sale terminal 110) may maintain a list of items to be purchased by the customer (i.e., an item list). The mobile device 101 and/or point-of-sale terminal may associate a transaction identifier, or other identifier, with the item list to identify the particular transaction to which the item list pertains. In this regard, the mobile device 101 may send the transaction identifier to the point-of-sale terminal in all or a portion of the communications between the entities to distinguish the particular item list from other item lists associated with other mobile devices in communication with the point-of-sale terminal.

In example embodiments, the mobile device 101 may be configured to scan a barcode associated with an item to be purchased by the customer. In this regard, the mobile device 101 may comprise a scanner, camera, or other suitable means for scanning a barcode. The barcode may be a two dimensional barcode, Quick Response (QR) code, or the like. The barcode may comprise a representation of an item code, which may be unique to the item, such as a Universal Product Code (UPC). The mobile device 101 may determine the item code from the scanned barcode. In example embodiments, the mobile device 101 may store the item code, for example, in a list of items to be purchased by the customer.

According to various embodiments, the mobile device 101 may send the item code to a point-of-sale terminal (e.g., point-of-sale terminal 105 or cloud point-of-sale terminal 110), in some instances along with the transaction identifier. The point-of-sale terminal may store the item code in the item list for the identified transaction. The point-of-sale terminal may look up additional information associated with the item (e.g., in a database associated with the point-of-sale terminal or a third party database) and send the additional item information related to the scanned item back to the mobile device 101. For example, the item information may include an item name, price, description, and/or the like. The mobile device 101 may update the stored information in the item list to reflect the item information received from the point-of-sale terminal. In certain embodiments, the point-of-sale terminal may similarly update the stored information in its own item list to reflect the item information.

According to some embodiments, the mobile device 101 may be configured to maintain and/or store information about the item list. For example, the mobile device 101 may maintain a running total of the price of all of the items in the item list. In another example, the mobile device 101 may maintain a list of the names of the items and, in some instances, the quantity of each item. The mobile device 101 may display any or all of this information to the customer during the shopping process. It should be understood that the examples above are not limiting, and the mobile device 101 may be configured to display any relevant transaction information to the customer during the shopping process. In certain instances, the point-of-sale terminal may maintain and/or store all or a portion of the information maintained by the mobile device 101.

In some instances, the item to be purchased may contain a barcode on the item. In these embodiments, the mobile device 101 may scan the item, store the item code from the barcode and/or the item information received from communication with the point-of-sale terminal, update the display to reflect the addition of the item, and wait for the next item to be scanned.

In other instances, the item to be purchased may not contain a barcode. For example, produce items at grocery stores frequently do not have barcodes. These non-barcoded items may instead have a single barcode provided near the item, for example on a structure (e.g., a shelf or case) or area where the item is stored, that may be scanned for each instance of the item available. For example, a shelf containing eggplants may have a barcode on the shelf that is scanned by each customer purchasing an eggplant. The non-barcoded items may be one of a plurality of non-barcoded item types, such as normal non-barcoded items, quantity required non-barcoded items, and weight required non-barcoded items. A normal non-barcoded item may be a single, fixed-price item, such as, for example, a head of lettuce. A quantity required non-barcoded item may be a fixed-priced item commonly purchased in groups, such as, for example, oranges. A weight required non-barcoded item may be an item having a price that depends on the weight of the item, such as, for example, bananas. Additional and/or alternative operations may be required to add the non-barcoded items to the customer's item list.

With respect to normal non-barcoded items, the mobile device 101 may scan the barcode associated with the item (e.g., on the shelf holding the item), store the item code from the barcode and/or the item information received from communication with the point-of-sale terminal, update the display to reflect the addition of the item, and wait for the next item to be scanned.

With respect to quantity required non-barcoded items, the mobile device 101 may scan the barcode associated with the item (e.g., on the shelf holding the item). The mobile device 101 may then send the item code determined from scanning the barcode to the point-of-sale terminal. The point-of-sale terminal may determine that the item code corresponds to a quantity required non-barcoded item. In these instances, the mobile device 101 may receive a message from the point-of-sale terminal indicating that a quantity of the item being purchased is required. The mobile device 101 may be configured to display a prompt to the customer requesting that the quantity be entered, such as via an interface associated with the mobile device 101 (e.g., a touch screen or keypad). The mobile device 101 may receive the user input and send the quantity entered to the point-of-sale terminal. The point-of-sale terminal may use the quantity information to determine certain item information to be returned to the mobile device 101, such as price. For example, if the mobile device 101 scans a barcode associated with oranges priced at $0.50 each and sends the point-of-sale terminal a quantity value of four, the point-of-sale terminal may return a price of $2.00 for the oranges to be purchased. Once the item information is received by the mobile device 101 from the point-of-sale terminal, the mobile device 101 may be configured to store the item code, quantity entered, and/or item information, update the display to reflect the addition of the item, and wait for the next item to be scanned.

With respect to weight required non-barcoded items, the mobile device 101 may scan the barcode associated with the item (e.g., on the shelf holding the item). The mobile device 101 may then send the item code determined from scanning the barcode to the point-of-sale terminal. The point-of-sale terminal may determine that the item code corresponds to a weight required non-barcoded item. In these instances, the mobile device 101 may receive a message from the point-of-sale terminal indicating that a weight of the item being purchased is required. The mobile device 101 may not be configured to determine a weight of the item. Instead, the mobile device 101 may flag the item in the item list to be weighed later at checkout.

In some embodiments, the mobile device 101 may have received item information from the point-of-sale terminal in addition to the message requesting the weight. In these embodiments, the mobile device 101 may store the item code and/or item information and associate a flag with the stored information to indicate the need to weigh the item at checkout. Once the information is stored and flagged by the mobile device 101, the mobile device 101 may update the display to reflect the new item and wait for the next item to be scanned.

In other embodiments, the mobile device 101 may not have received item information from the point-of-sale terminal in addition to the request for a weight. In these embodiments, the mobile device 101 may store the item code determined from scanning the barcode and associate a flag with the stored item code to indicate the need to weigh the item at checkout. In some instances, the mobile device 101 may be configured to send a response to the point-of-sale terminal indicating that no weight is available at this time. Once the item code is stored and flagged by the mobile device 101, and a response is sent to the point-of-sale terminal if necessary, the mobile device 101 may update the display to reflect the new item and wait for the next item to be scanned.

In the above embodiments, the point-of-sale terminal may also be configured to store the item code and, if available, any additional item information associated with the item in the item list. The point-of-sale terminal may flag the item in the item list to indicate the item needs to be weighed at checkout.

It should be noted that the point-of-sale terminal described in the various embodiments above may be a point-of-sale terminal 105 located at the store or a cloud point-of-sale terminal 110. In instances where the above operations are performed by a cloud point-of-sale terminal 110, the cloud point-of-sale terminal 110 may be configured to communicate with a point-of-sale terminal 105 (e.g., a point-of-sale terminal 105 located in the store) to provide information about the customer's transaction, such as the stored item list and item information.

Once the mobile device 101 has scanned all items to be purchased, the customer may proceed to complete the transaction for purchase at the checkout area.

According to various embodiments, the customer may select a point-of-sale terminal 105 where he would like to complete the transaction. In some embodiments, the mobile device 101 may provide an indication to the point-of-sale terminal 105 identifying that the transaction to be completed relates to a transaction associated with the mobile device 101. To provide the indication to the appropriate point-of-sale terminal 105, the mobile device 101 may be configured to establish communication with, or otherwise indicate a selection of, the particular point-of-sale terminal 105. In this regard, the mobile device 101 may display a barcode or other indicator of the transaction to be scanned by or entered into the point-of-sale terminal 105. In other embodiments, the point-of-sale terminal 105 may provide an indication to the mobile device 101 allowing the mobile device 101 to particularly identify the point-of-sale terminal 105 being used to complete the transaction. The point-of-sale terminal 105 may display a barcode or other indication that may be scanned by or entered into the mobile device 101. For example, the point-of-sale terminal 105 may have a barcode tag associated with it that may be scanned by the mobile device 101. In yet other embodiments, the mobile device 101 may receive input from the customer identifying the point-of-sale terminal 105 (e.g., a point-of-sale identifier) and establish communication with the point-of-sale terminal 105 over a network.

The mobile device 101 may be configured to send the selected point-of-sale terminal 105 an indication of the transaction to be completed at the point-of-sale terminal 105. The indication may comprise the transaction identifier known by the mobile device 101 and the point-of-sale terminal 105. In other instances, the identifier may comprise the item list stored by the mobile device 101 during the shopping process. The mobile device 101 may send the indication to the point-of-sale terminal 105 directly (e.g., via a Bluetooth™ or Near Field Communication (NFC) connection) or indirectly (e.g., via a network, such as network 115).

According to example embodiments, the point-of-sale terminal 105 may receive the item list for the transaction from the mobile device 101 or retrieve the item list from its storage based on the transaction identifier received from the mobile device 101. The point-of-sale terminal 105 may determine if any items in the item list have been flagged to be weighed at the point-of-sale terminal 105.

In an instance in which one or more items are flagged to be weighed, the point-of-sale terminal 105 may begin with the first weight required non-barcoded item in the item list. The point-of-sale terminal 105 may identify the item to be weighed. For example, the point-of-sale terminal 105 may display the item name on a display associated with the point-of-sale terminal 105. In another example, the point-of-sale terminal 105 may play an audible prompt to the customer describing the item to be weighed (e.g., by name). In yet another example, the point-of-sale terminal 105 may send an indication of the item (e.g., the item name or item code) to the mobile device 101 so that the mobile device 101 may prompt the user to weigh the item (e.g., via the mobile device 101 display or an audible message).

In various embodiments, the point-of-sale terminal 105 and/or mobile device 101 may display an image of the item to be weighed. Displaying such an image may assist the customer in identifying the item while allowing a store clerk to monitor the weighing transaction and verify that the customer weighs the correct item when prompted. In this regard, the point-of-sale terminal 105 may search a database (e.g., a local database or a third party database) of item images to locate the image corresponding to the item to be weighed. The point-of-sale terminal 105 may send a copy of the image or a link to the image to the mobile device 101. The point-of-sale terminal 105 may display the image on the display at a size large enough for a store clerk nearby to view the image.

Once the item has been identified and/or the image of the item has been displayed, the customer may place the item on a weighing device (e.g., a scale) associated with the point-of-sale terminal 105. The point-of-sale terminal 105 may weigh the item and store the weight along with the item information for that item in the item list. The point-of-sale terminal 105 may further calculate the price of the item based on the determined weight. The updated item information (e.g., weight, price, etc.) may be sent by the point-of-sale terminal 105 to the mobile device 101. The mobile device 101 may update the item information in its item list to reflect the information sent by the point-of-sale terminal 105 and update the display. The customer may then remove the item from the weighing device of the point-of-sale terminal 105 and return the item to the bag or cart.

The point-of-sale terminal 105 may continue to identify, display, and weigh the weight required non-barcoded items from the item list until all such items have been processed. The customer may then proceed to finish the transaction and pay for the items purchased. In some instances, the customer may complete the transaction via the point-of-sale terminal 105. For example, the point-of-sale terminal 105 may provide an interface allowing the customer to select an option for payment, provide the payment (e.g., via a credit card reader or cash acceptor), and finish the transaction. In other instances, the customer may complete the transaction via the mobile device 101. For example, the mobile device 101 may provide an interface allowing the customer to select an option for payment, provide the payment (e.g., via digital wallet), and finish the transaction. In yet other instances, the customer may complete the transaction using both the mobile device 101 and the point-of-sale terminal 105. For example, the mobile device 101 may permit the customer to select a payment option, while the point-of-sale terminal 105 may provide the interface for accepting the payment. The mobile device 101 and/or the point-of-sale terminal 105 may provide the customer with a receipt (e.g., a paper or digital receipt) for the transaction.

In certain embodiments, additional audit procedures may be performed before completing the transaction. For example, the point-of-sale terminal 105 may be configured to weigh the bags or cart containing all of the items from the item list. The point-of-sale terminal 105 may then compare the total weight measured with a predicted weight based on a combination of the typical weights of the barcoded, normal non-barcoded, and quantity required non-barcoded items and the measured weights of the weight required non-barcoded items. If the measured total weight differs from the predicted total weight by more than a predetermined threshold, the point-of-sale terminal 105 may alert the store clerk to a possible discrepancy due to user error or theft.

FIG. 4 provides a flowchart according to an example method for facilitating in-aisle scanning. The operations performed by a method, apparatus, and computer program product of this example embodiment are illustrated from the perspective of an apparatus 200 embodied as a mobile device 101. The apparatus 200 embodied by the mobile device 101 may comprise means, such as the specialization circuitry 218, the processor 210, or the like. In this example embodiment, the various operations may be performed by the specialized circuitry 218 embodied as in-aisle scanning circuitry. The method, apparatus, and computer program product for facilitating in-aisle scanning of one or more items to be purchased at a store may comprise scanning a barcode associated with an item at operation 400. At operation 405, the method, apparatus, and computer program product may comprise adding the item to a list of items to be purchased. The method, apparatus, and computer program product may comprise receiving an indication that the item needs to be weighed at operation 410. At operation 415, the method, apparatus, and computer program product may comprise flagging the item in the list to be weighed during checkout.

FIG. 5 provides a flowchart according to an example method for facilitating in-aisle scanning. The operations performed by a method, apparatus, and computer program product of this example embodiment are illustrated from the perspective of an apparatus 200 embodied as a point-of-sale terminal 105. The apparatus 200 embodied by the mobile device 101 may comprise means, such as the specialization circuitry 218, the processor 210, or the like. In this example embodiment, the various operations may be performed by the specialized circuitry 218 embodied as point-of-sale circuitry. The method, apparatus, and computer program product for facilitating a transaction at a store for one or more items scanned in-aisle may comprise receiving an indication of a list of items to be purchased at operation 500. The list may comprise an item flagged to be weighed. At operation 505, the method, apparatus, and computer program product may comprise displaying an image of the item flagged to be weighed. The method, apparatus, and computer program product may comprise providing a request to a user to weigh the item at operation 510.

FIGS. 4 and 5 illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212) of an apparatus, server, or other computing device (e.g., apparatus 200) and executed by a processor (e.g., processor 210) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

Numerous benefits may be realized from the implementation of embodiments of the present invention. In various advantageous embodiments, a customer may be able to scan items in-aisle that do not have individual barcodes on them. In other advantageous embodiments, users may scan items that require further action and have those items automatically presented at checkout. For example, a customer can scan an item while in-aisle that must be weighed and then subsequently weigh the item at checkout. This approach provides the further advantage of allowing the point-of-sale device to quickly identify those items requiring additional actions, like weighing, without requiring the customer to go through time-consuming tasks at checkout, such as searching for the product they wish to weigh using a UPC list or picture list. Various embodiments provide advantages with respect to security as well. Many stores have negative impressions of self-checkout due to the potential for theft or deceit. For example, some customers may select a low cost item (e.g., bananas) that they pretend to weigh, while in fact they are weighing high price items (e.g., meat). By displaying large images of the item to be weighed on the display of the point-of-sale device, a store attendant may be better equipped to monitor customers during self-checkout to ensure that they are weighing the item they are meant to weigh. As a result, the customers are content due to the improved efficiency and fewer delays at self-checkout, while stores are content due to the decreased risk of theft or deceit.

Various modifications may be made to the above described embodiments within the scope of the invention, for example, in other embodiments a store clerk may weigh the flagged items at the point-of-sale terminal 105.

In other embodiments, the mobile device 101 may not communicate with a point-of-sale terminal 105 until reaching checkout. In this regard, the mobile device 101 may scan the barcodes of the items and store the item codes during shopping. The mobile device 101 may then transfer the item list to the point-of-sale terminal 105 at checkout. The point-of-sale terminal 105 may then determine whether any items require quantities or weights and prompt the customer (e.g., via an interface associated with either the point-of-sale terminal 105 or the mobile device 101) to enter the quantities and/or to weigh the items.

In yet other embodiments, the item information provided to the mobile device 101 by the point-of-sale terminal 105 may comprise tax information, sale and/or discount information, food stamp qualification information, and/or the like.

In other embodiments, the images of the items may be stored by the point-of-sale terminal 105, in a database associated with the point-of-sale terminal 105, in a database associated with another entity connected to the point-of-sale terminal 105, in a third party database, and/or the like.

In some embodiments, the term database may refer to a memory associated with a particular apparatus. For example, the database used to store the picture list may be the memory of the point-of-sale terminal 105.

In yet other embodiments, the mobile device 101 may store the item information directly in its memory (e.g., memory 212) rather than obtaining the item information from the point-of-sale terminal 105. In some embodiments, the mobile device 101 may obtain the item information from an entity connected to the mobile device 101 other than the point-of-sale terminal 105.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method for facilitating in-aisle scanning of one or more items to be purchased at a store comprising:
   scanning a barcode associated with an item;
   adding the item to a list of items to be purchased;
   receiving an indication that the item needs to be weighed; and
   flagging the item in the list to be weighed during checkout.

2. The method of claim 1, wherein scanning the barcode comprises capturing an image of the barcode with a camera.

3. The method of claim 1, wherein scanning the barcode associated with the item further comprises scanning the barcode associated with the item at a first location in the store proximate a second location in the store where the item is on display and remote from a third location in the store where checkout occurs.

4. The method of claim 3, wherein scanning the barcode associated with the item further comprises scanning a barcode located on a structure proximate the second location where the item is on display.

5. The method of claim 1, further comprising:
   determining an item code for the item from the barcode;
   sending the item code to a point-of-sale device; and
   receiving the indication that the item needs to be weighed from the point-of-sale device.

6. The method of claim 1, further comprising:
   sending an indication of the list of items to be purchased to a point-of-sale device, wherein the list of items comprises one or more items flagged to be weighed during checkout.

7. A method for facilitating a transaction at a store for one or more items scanned in-aisle comprising:
   receiving an indication of a list of items to be purchased, wherein the list comprises an item flagged to be weighed;
   displaying an image of the item flagged to be weighed; and
   providing a request to a user to weigh the item.

8. The method of claim 7, wherein the request comprises an identification of the item comprising at least one of a text identification and an audio identification.

9. The method of claim 7, further comprising:
   storing the list of items to be purchased in association with a transaction identifier, wherein the received indication of the list of items to be purchased comprises the transaction identifier.

10. The method of claim 9, wherein storing the list of items to be purchased further comprises:
    receiving at least one message from a mobile device, each message identifying an item scanned by the mobile device to be added to the list of items to be purchased; and
    storing the item identified in each method to the list of items to be purchased.

11. The method of claim 7, wherein the list of items comprises an item code for each item in the list, and wherein displaying an image of the item flagged to be weighed further comprises:
    searching for the image of the item flagged to be weighed in a database based at least in part on the item code associated with the item; and
    obtaining the image from the database.

12. An apparatus for facilitating in-aisle scanning of one or more items to be purchased at a store comprising:
    at least one processor; and
    at least one memory comprising computer program code, the at least one memory and the computer program code configured to, with the at least one processor, cause the apparatus at least to:
    scan a barcode associated with an item;
    add the item to a list of items to be purchased;
    receive an indication that the item needs to be weighed; and
    flag the item in the list to be weighed during checkout.

13. The apparatus of claim 12, wherein in order to scan the barcode, the at least one memory and the computer program code are further configured to, with the at least one processor, cause the apparatus to capture an image of the barcode with a camera.

14. The apparatus of claim 12, wherein in order to scan the barcode associated with the item, the at least one memory and the computer program code are further configured to, with the at least one processor, cause the apparatus to scan the barcode associated with the item at a first location in the store proximate a second location in the store where the item is on display and remote from a third location in the store where checkout occurs.

15. The apparatus of claim 14, wherein in order to scan the barcode associated with the item, the at least one memory and the computer program code are further configured to, with the at least one processor, cause the apparatus to scan a barcode located on a structure proximate the second location where the item is on display.

16. The apparatus of claim 12, wherein the at least one memory and the computer program code are further configured to, with the at least one processor, cause the apparatus to:
   determine an item code for the item from the barcode;
   send the item code to a point-of-sale device; and
   receive the indication that the item needs to be weighed from the point-of-sale device.

17. The apparatus of claim 12, wherein the at least one memory and the computer program code are further configured to, with the at least one processor, cause the apparatus to:
   send an indication of the list of items to be purchased to a point-of-sale device, wherein the list of items comprises one or more items flagged to be weighed during checkout.

18. An apparatus for facilitating a transaction at a store for one or more items scanned in-aisle comprising:
   at least one processor; and
   at least one memory comprising computer program code, the at least one memory and the computer program code configured to, with the at least one processor, cause the apparatus at least to:
      receive an indication of a list of items to be purchased, wherein the list comprises an item flagged to be weighed;
      display an image of the item flagged to be weighed; and
      provide a request to a user to weigh the item.

19. The apparatus of claim 18, wherein the request comprises an identification of the item comprising at least one of a text identification and an audio identification.

20. The apparatus of claim 18, wherein the at least one memory and the computer program code are further configured to, with the at least one processor, cause the apparatus to:
   store the list of items to be purchased in association with a transaction identifier, wherein the received indication of the list of items to be purchased comprises the transaction identifier.

21. The apparatus of claim 20, wherein in order to store the list of items to be purchased, the at least one memory and the computer program code are further configured to, with the at least one processor, cause the apparatus to:
   receive at least one message from a mobile device, each message identifying an item scanned by the mobile device to be added to the list of items to be purchased; and
   store the item identified in each method to the list of items to be purchased.

22. The apparatus of claim 18, wherein the list of items comprises an item code for each item in the list, and wherein in order to display an image of the item flagged to be weighed, the at least one memory and the computer program code are further configured to, with the at least one processor, cause the apparatus to:
   search for the image of the item flagged to be weighed in a database based at least in part on the item code associated with the item; and
   obtain the image from the database.

\* \* \* \* \*